United States Patent
Okanishi et al.

(10) Patent No.: US 10,358,515 B2
(45) Date of Patent: Jul. 23, 2019

(54) PROCESSING AID FOR POLYOLEFINS AND A POLYOLEFIN COMPOSITION

(71) Applicant: DAIKIN INDUSTRIES, LTD., Osaka-shi, Osaka (JP)

(72) Inventors: Ken Okanishi, Settsu (JP); Yoshichika Komiya, Setsu (JP); Takafumi Yamato, Setsu (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 123 days.

(21) Appl. No.: 15/175,266

(22) Filed: Jun. 7, 2016

(65) Prior Publication Data

US 2016/0369022 A1    Dec. 22, 2016

(30) Foreign Application Priority Data

Jun. 16, 2015 (JP) ................................. 2015-121323

(51) Int. Cl.

| | |
|---|---|
| *C08F 214/26* | (2006.01) |
| *C08F 210/02* | (2006.01) |
| *C08F 214/22* | (2006.01) |
| *C08K 5/06* | (2006.01) |
| *C08L 23/02* | (2006.01) |
| *C08L 23/04* | (2006.01) |
| *C08L 23/06* | (2006.01) |
| *C08L 25/04* | (2006.01) |
| *C08L 23/08* | (2006.01) |

(52) U.S. Cl.
CPC ........ *C08F 214/265* (2013.01); *C08F 210/02* (2013.01); *C08F 214/22* (2013.01); *C08F 214/26* (2013.01); *C08F 214/262* (2013.01); *C08F 214/267* (2013.01); *C08K 5/06* (2013.01); *C08L 23/02* (2013.01); *C08L 23/04* (2013.01); *C08L 23/06* (2013.01); *C08L 23/08* (2013.01); *C08L 25/04* (2013.01); *C08L 2205/06* (2013.01)

(58) Field of Classification Search
CPC .. C08F 214/265; C08F 210/02; C08F 214/22; C08F 214/26; C08F 214/262; C08F 214/267; C08K 5/06; C08L 23/02; C08L 23/04; C08L 23/06; C08L 23/08; C08L 25/04; C08L 2205/06

USPC ........................................................ 524/520

See application file for complete search history.

(56) References Cited

U.S. PATENT DOCUMENTS

| | | | |
|---|---|---|---|
| 5,547,761 A * | 8/1996 | Chapman, Jr. ........ | C08F 214/26 156/182 |
| 5,710,217 A | 1/1998 | Blong et al. | |
| 2004/0242771 A1* | 12/2004 | Kubo ................... | C08G 65/007 525/55 |
| 2016/0145368 A1 | 5/2016 | Okanishi et al. | |

FOREIGN PATENT DOCUMENTS

| | | | | |
|---|---|---|---|---|
| JP | 7-506873 | A | 7/1995 | |
| JP | 11-501685 | A | 2/1999 | |
| JP | 2004-502010 | A | 1/2004 | |
| WO | 94/05712 | A1 | 3/1994 | |
| WO | 95/14719 | A1 | 6/1995 | |
| WO | 96/24624 | A2 | 8/1996 | |
| WO | 02/00783 | A1 | 1/2002 | |
| WO | 03/044088 | A1 | 5/2003 | |
| WO | 2011/025052 | A1 | 3/2011 | |
| WO | WO-2011025052 | A1 * | 3/2011 | ............ C08F 214/18 |
| WO | 2014/203727 | A1 | 12/2014 | |

OTHER PUBLICATIONS

Communication dated Aug. 30, 2016, from the European Patent Office in counterpart European Application No. 16173490.0.

* cited by examiner

*Primary Examiner* — Ronald Grinsted

(74) *Attorney, Agent, or Firm* — Sughrue Mion, PLLC

(57) ABSTRACT

The present invention provides a processing aid for polyolefins capable of improving the processability in processing polyolefins at a temperature lower than 220° C. and a high shear rate. The processing aid for polyolefins is intended to be used in processing a polyolefin at a temperature lower than 220° C., and contains a fluoropolymer that includes a polymerized unit (a) based on $CF_2=CFCF_3$ and a polymerized unit, (b) based on at least one selected from the group consisting of monomers represented by $CH_2=CX^{11}Y^{11}$ and monomers represented by $CF_2=CX^{21}Y^{21}$.

8 Claims, 1 Drawing Sheet

PROCESSING AID FOR POLYOLEFINS AND A POLYOLEFIN COMPOSITION

TECHNICAL FIELD

The present invention relates to processing aids for polyolefins and polyolefin compositions.

BACKGROUND ART

In order to improve the productivity and reduce the cost in processing melt-fabricable polymers, extrusion processing at a high extrusion rate is required. Melt-fabricable polymer compositions, however, inevitably have a critical shear rate, and processing at a rate higher than this rate causes a state that a surface is roughened (which is called melt fracture), leading to a failure in providing favorable articles.

One example of methods that can solve such problems, avoid melt fracture, achieve a higher extrusion rate, and improve the extrudability is a method of processing a material at a higher processing temperature. However, high-temperature processing causes pyrolysis of melt-fabricable polymers, which raises problems such as reduction in mechanical properties of articles and staining on articles. In addition, the melt-fabricable polymers are caused to have a lower melt viscosity, and thus drip off or deform before being cooled and solidified. This impairs the dimensional accuracy of articles.

In order to improve the processability in polymer processing, methods of adding a processing aid to a polymer are proposed.

For example, Patent Literature 1 discloses a low-temperature-decomposable engineering plastic having a melting point of 200° C. or lower and a decomposition temperature of 300° C. or lower which can lead to improved processability in processing the low-temperature-decomposable engineering plastic by, for example, reducing the extrusion pressure and the extrusion torque. The literature also discloses a low-temperature-decomposable engineering plastic resin composition obtained by compounding a low-temperature-decomposable engineering plastic and a fluorine-containing resin formed from a fluorine-containing polymer in which a non-terminal carbon atom(s) constituting the main chain is/are coupled with at least one atom selected from the group consisting of a hydrogen atom, a chlorine atom, a bromine atom, and an iodine atom and with a fluorine atom which is substantially free from a polar functional group reactive with the low-temperature-decomposable engineering plastic.

Patent Literature 2 discloses that a chemically resistant fluoropolymer consisting of a fluorinated olefin monomer $CF_2=CXR^1$ (wherein X is a hydrogen or halogen atom; and $R^1$ is an alkyl group, for example) and a substantially non-fluorinated olefin monomer $CH_2=CXR^2$ (wherein X is a hydrogen or halogen atom; and $R^2$ is, for example, an alkyl group) is used so as to improve the processability of melt-fabricable thermoplastic hydrocarbon polymers.

Patent Literature 3 discloses a processing aid for polyolefins containing an ethylene/tetrafluoroethylene copolymer alone as a fluoropolymer.

CITATION LIST

Patent Literature

Patent Literature 1: WO 2003/044088
Patent Literature 2: U.S. Pat. No. 5,710,217 B
Patent Literature 3: WO 2014/203727

SUMMARY OF INVENTION

Technical Problem

Conventional processing aids have difficulty in improving the processability in processing polyolefins at a low temperature and a high shear rate.

In consideration of the above state of the art, the present invention aims to provide a processing aid for polyolefins capable of improving the processability in processing polyolefins at a temperature lower than 220° C. and a high shear rate.

Solution to Problem

Specifically, the present invention relates to a processing aid for polyolefins intended to he used in processing a polyolefin at a temperature lower than 220° C., containing a fluoropolymer that includes a polymerized unit (a) based on $CF_2=CFCF_3$ and a polymerized unit (b) based on at least one selected from the group consisting of:

monomers represented by the following formula (1):

$$CH_2=CX^{11}Y^{11}$$

wherein $X^{11}$ is H, F, $CH_3$, or $CF_3$; and $Y^{11}$ is an alkyl group, a fluoroalkyl group, an alkoxy group, or a fluoroalkoxy group; and monomers represented by the following formula (2):

$$CF_2=CX^{21}Y^{21}$$

wherein $X^{21}$ is H or F; and $Y^{21}$ is an alkyl group, a fluoroalkyl group, an alkoxy group, or a fluoroalkoxy group, excluding $CF_2=CFCF_3$.

The fluoropolymer preferably has a melting point of 110° C. to 220° C.

Preferably, the fluoropolymer further includes a polymerized unit (c) based on ethylene and a polymerized unit (d) based on tetrafluoroethylene, a proportion of the polymerized unit (a) is 0.1 to 25 mol % relative to the sum of the polymerized units (a) to (d), a proportion of the polymerized unit (b) is 0.1 to 10 mol % relative to the sum of the polymerized units (a) to (d), and a mole ratio (c)/(d) between the polymerized unit (c) and the polymerized unit (d) is 70/30 to 10/90.

$Y^{11}$ is preferably represented by the following formula:

$$-(CF_2)_{n11}Z^{11}$$

wherein $n^{11}$ is an integer of 1 to 10; and $Z^{11}$ is H or F.

Preferably, $X^{21}$ is F; and $Y^{21}$ is represented by $-O(CF_2CF(Z^{21})O)_{m21}(CF_2)_{n21}F$ (wherein $Z^{21}$ is a fluorine atom or a trifluoromethyl group; $m^{21}$ is an integer of 1 to 4; and $n^{21}$ is an integer of 1 to 4).

Preferably, the fluoropolymer further includes a polymerized unit (c) based on ethylene and a polymerized unit (d) based on tetrafluoroethylene, the polymerized unit (b) is based on at least one selected from the group consisting of: monomers represented by $CH_2=CF(CF_2)_{n12}H$ (wherein $n^{12}$ is an integer of 1 to 10); monomers represented by $CH_2=CH(CF_2)_{n13}F$ (wherein $n^{13}$ is an integer of 1 to 10); and $CH_2=C(CF_3)_2$, a proportion of the polymerized unit (a) is 0.1 to 25 mol % relative to the sum of the polymerized units (a) to (d), a proportion of the polymerized unit (b) is 0.1 to 10 mol % relative to the sum of the polymerized units (a) to (d), and a mole ratio (c)/(d) between the polymerized unit (c) and the polymerized unit (d) is 70/30 to 10/90.

Preferably, the fluoropolymer further includes a polymerized unit (c) based on ethylene and a polymerized unit (d) based on tetrafluoroethylene, and the polymerized unit (b) is based on at least one monomer selected from the group consisting of $CH_2=CF(CF_2)_3H$, $CH_2=CH(CF_2)_6F$, and $CH_2=CH(CF_2)_4F$.

The processing aid for polyolefins preferably further contains at least one surfactant selected from the group consisting of silicone-polyether copolymers, aliphatic polyesters, aromatic polyesters, polyether polyols, amine oxides, carboxylic acids, aliphatic esters, and poly(oxyalkylenes) in an amount of 1 to 99 mass % in the processing aid.

The present invention also relates to a polyolefin composition including the processing aid for polyolefins and a polyolefin, an amount of the processing aid for polyolefins being 0.0005 to 10 mass % relative to the whole mass of the composition, the processing aid for polyolefins being dispersed in a form of particles in the polyolefin, the average dispersed particle size of the processing aid for polyolefins being 10 μm or smaller in the polyolefin.

The polyolefin is preferably at least one selected from the group consisting of low-density polyethylene, linear low-density polyethylene, high-density polyethylene, metallocene linear low-density polyethylene, polypropylene, polystyrene, and polyvinyl chloride.

Advantageous Effects of Invention

The processing aid for polyolefins of the present invention is capable of improving the processability in processing polyolefins at a temperature lower than 220° C. and a high shear rate.

DESCRIPTION OF EMBODIMENTS

Figure 1:
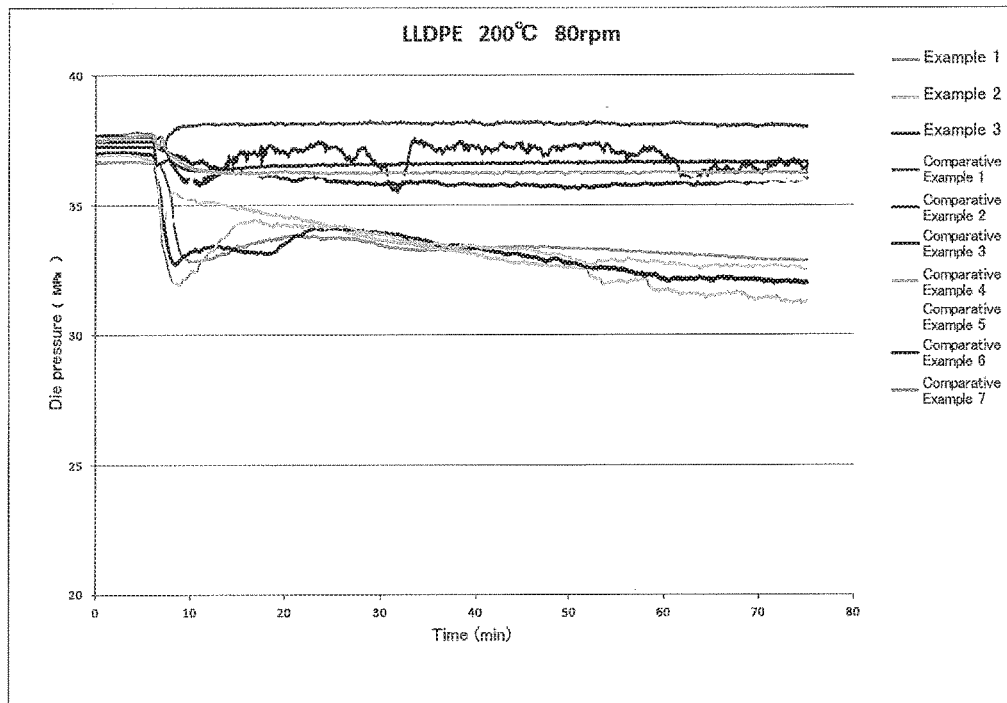
FIG. 1 is a graph of die pressure changes over time during extrusion in Examples 1 to 3 and Comparative Examples 1 to 7.

The present invention will be described in detail below.

The processing aid for polyolefins of the present invention is intended to be used in processing polyolefins at a temperature lower than 220° C. The processing aid for polyolefins of the present invention is capable of exerting an excellent effect of improving the processability in processing polyolefins at the aforementioned low temperature. The temperature for processing polyolefins is preferably 210° C. or lower. The processing temperature may be 140° C. or higher, and may be 180° C. or higher.

The processing aid for polyolefins of the present invention contains a fluoropolymer including a polymerized unit (a) based on $CF_2=CFCF_3$ and a polymerized unit (b).

The polymerized unit (b) is a polymerized unit based on at least one selected from the group consisting of monomers represented by the following formula (1) and monomers represented by the following formula (2).

$$CH_2=CX^{11}Y^{11} \quad \text{Formula (1):}$$

wherein $X^{11}$ is H, F, $CH_3$, or $CF_3$; and $Y^{11}$ is an alkyl group, a fluoroalkyl group, an alkoxy group, or a fluoroalkoxy group.

$$CF_2=CX^{21}Y^{21} \quad \text{Formula (2):}$$

wherein $X^{21}$ is H or F; and $Y^{21}$ is an alkyl group, a fluoroalkyl group, an alkoxy group, or a fluoroalkoxy group (excluding $CF_2=CFCF_3$).

In the formula (1), $Y^{11}$ is preferably represented by $-(CF_2)_{n11}Z^{11}$ (wherein $n^{11}$ is an integer of 1 to 10; and $Z^{11}$ is H or F). Preferably, $n^{11}$ is an integer of 2 to 6.

Examples of the monomers represented by the formula (1) include $CH_2=CF(CF_2)_2F$, $CH_2=CF(CF_2)_3F$, $CH_2=CF(CF_2)_4F$, $CH_2=CF(CF_2)_2H$, $CH_2=CF(CF_2)_3H$, $CH_2=CF(CF_2)_4H$, $CH_2=CH(CF_2)_2F$, $CH_2=CH(CF_2)_3F$, $CH_2=CH(CF_2)_4F$, $CH_2=CH(CF_2)_6F$, $CH_2=CH(CF_2)_2H$, $CH_2=CH(CF_2)_3H$, $CH_2CH(CF_2)_4H$, and $CH_2=C(CF_3)_2$.

The monomer represented by the formula (1) is preferably at least one selected from the group consisting of: monomers represented by $CH_2=CF(CF_2)_{n12}H$ (wherein $n^{12}$ is an integer of 1 to 10); monomers represented by $CH_2=CH(CF_2)_{n13}F$ (wherein $n^{13}$ is an integer of 1 to 10), and $CH_2=C(CF_3)_2$. Preferably, $n^{12}$ is an integer of 2 to 8. Preferably, $n^{13}$ is an integer of 2 to 8.

In the formula (2), $X^{21}$ is preferably F. In the formula (2), $Y^{21}$ is preferably represented by the following formula:
—$ORf^{21}$ (wherein $Rf^{21}$ is a C1-C8 perfluoroalkyl group);
—$OCF_2ORf^{22}$ (wherein $Rf^{22}$ is a C1-C6 linear or branched perfluoroalkyl group, a C5-C6 cyclic perfluoroalkyl group, or a C2-C6 linear or branched perfluorooxyalkyl group having 1 to 3 oxygen atom(s)); or
—$O(CF_2CF(Z^{21})O)_{m21}(CF_2)_{n21}F$ (wherein $Z^{21}$ is a fluorine atom or a trifluoromethyl group; $m^{21}$ is an integer of 1 to 4; and $n^{21}$ is an integer of 1 to 4).

$Y^{21}$ is preferably represented by —$O(CF_2CF(Z^{21})O)_{m21}(CF_2)_{n21}F$ (wherein $Z^{21}$ is a fluorine atom or a trifluoromethyl group; $m^{21}$ is an integer of 1 to 4; and $n^{21}$ is an integer of 1 to 4) among the above. $Y^{21}$ is also preferably represented by the formula:

—$O(CF_2)_{n22}CF_3$ (wherein $n^{22}$ is an integer of 0 to 4). Preferably, $n^{22}$ is an integer of 0 to 3.

The monomer represented by the formula (2) is preferably at least one selected from the group consisting of monomers represented by $CF_2=CF-O(CF_2CF(Z^{21})O)_{m21}(CF_2)_{n21}F$ (wherein $Z^{21}$ is a fluorine atom or a trifluoromethyl group; $m^{21}$ is an integer of 1 to 4; and $n^{21}$ is an integer of 1 to 4) and monomers represented by $CF_2=CF-O(CF_2)_{n22}CF_3$ (wherein $n^{22}$ is an integer of 0 to 4), more preferably at least one monomer selected from the group consisting of $CF_2=CF-OCF_2CF(CF_3)OCF_2CF_2CF_3$, $CF_2=CF-O(CF_2CF(CF_3)O)_2CF_2CF_2CF_3$, $CF_2=CFOCF_3$, $CF_2=CFOCF_2CF_3$, and $CF_2=CFOCF_2CF_2CF_3$.

The polymerized unit (b) is preferably a polymerized unit based on a monomer represented by the formula (1) among the polymerized units based on the monomers represented by the formulas (1) and (2), more preferably a polymerized unit based on a monomer represented by $CH_2=CX^{11}-(CF_2)_{n11}Z^{11}$ (wherein $X^{11}$ is H, F, $CH_3$, or $CF_3$; $n^{11}$ is an integer of 1 to 10; and $Z^{11}$ is H or F), still more preferably a polymerized unit based on at least one selected from the group consisting of monomers represented by the formula: $CH_2=CF(CF_2)_{n12}H$ (wherein $n^{12}$ is an integer of 1 to 10); monomers represented by $CH_2=CH(CF_2)_{n13}F$ (wherein $n^{13}$ is an integer of 1 to 10); and $CH_2=C(CF_3)_2$, particularly preferably a polymerized unit based on at least one monomer selected from the group consisting of $CH_2=CF(CF_2)_3H$, $CH_2=CH(CF_2)_4F$, and $CH_2=CH(CF_2)_6F$.

The fluoropolymer preferably includes the polymerized unit (a) in an amount of 0.1 to 25 mol % relative to all the polymerized units constituting the fluoropolymer. The amount of the polymerized unit (a) is more preferably 5 mol % or more, still more preferably 8 mol % or more, while more preferably 20 mol % or less, still more preferably 16 mol % or less, relative to all the polymerized units.

The fluoropolymer preferably includes the polymerized unit (b) in an amount of 0.1 to 10 mol % relative to all the polymerized units constituting the fluoropolymer. The amount of the polymerized unit (b) is more preferably 0.3 mol % or more, still more preferably 0.5 mol % or more, while more preferably 8 mol % or less, still more preferably 6 mol % or less, much more preferably 5 mol % or less, particularly preferably 3 mol % or less, relative to all the polymerized units.

The fluoropolymer preferably has a melting point of 110° C. to 220° C. The melting point is more preferably 120° C. or higher, still more preferably 140° C. or higher, particularly preferably 150° C. or higher, most preferably 160° C. or higher, while more preferably 210° C. or lower, still more preferably 200° C. or lower, particularly preferably 195° C. or lower, most preferably 180° C. or lower.

The melting point can be determined as a temperature corresponding to the maximum value on a heat-of-fusion curve obtained at a temperature-increasing rate of 10° C./min using a differential scanning calorimeter (DSC).

The fluoropolymer preferably has a melt flow rate (MFR) of 0.1 to 80 g/10 min. The MFR is more preferably 0.5 or higher, still, more preferably 1 or higher, while more preferably 50 or lower, still more preferably 30 or lower.

The MFR can be determined using a melt indexer (Toyo Seiki Seisaku-sho, Ltd.) in conformity with ASTM D3159.

The fluoropolymer preferably has a glass transition temperature of 50° C. to 120° C., more preferably 60° C. to 110° C.

The glass transition temperature can be determined by differential scanning calorimetry (DSC).

The fluoropolymer preferably further includes a polymerized unit (c) based on ethylene and a polymerized unit (d) based on tetrafluoroethylene.

In the fluoropolymer, the mole ratio (c)/(d) between the polymerized unit (c) and the polymerized unit (d) is preferably 70/30 to 10/90. The mole ratio is more preferably 60/40 to 20/80, still more preferably 55/45 to 25/75, much more preferably 55/45 to 40/60.

In the present description, the amounts of the monomer units are values determined by $^{19}$F-NMR analysis.

The fluoropolymer is particularly preferably a fluoropolymer including 8 to 16 mol % of the polymerized unit (a),
0.1 to 3 mol % of the polymerized unit (b),
35 to 55 mol % of the polymerized unit (c), and
35 to 55 mol % of the polymerized unit (d).

In the above particularly preferred fluoropolymer, the polymerized unit (b) is particularly preferably a polymerized unit based on at least one selected from the group consisting of: monomers represented by $CH_2=CF(CF_2)_{n12}H$ (wherein $n^{12}$ is an integer of 2 to 8); monomers represented by $CH_2=CH(CF_2)_{n13}F$ (wherein $n^{13}$ is an integer of 2 to 8); $CH_2=C(CF_3)_2$; and monomers represented by $CF_2=CFO(CF_2)_{n22}CF_3$ (wherein $n^{22}$ is an integer of 0 to 4). The polymerized unit (b) is still more preferably a polymerized unit based on at least one monomer selected from the group consisting of $CH_2=CF(CF_2)_3H$, $CH_2=CH(CF_2)_4F$, $CH_2=CH(CF_2)_6F$, $CF_2=CFOCF_3$, and $CF_2=CFOCF_2CF_2CF_3$.

The fluoropolymer preferably has at least one group selected from the group consisting of $—CONH_2$, $—OCOOR$ (wherein R is a C1-C6 alkyl group), $—CH_2OH$, $—COF$, and $—COOH$ at an end of the main chain or at a side chain. The fluoropolymer having such a functional group can improve the affinity between the metal surface of a die and the processing aid. Accordingly, when used for a processing aid, the fluoropolymer improves the pressure-decreasing rate and increases the amount of decrease in pressure.

The functional group can be introduced into the fluoropolymer by appropriately selecting a polymerization initiator or a monomer having the functional group at a side chain used in the polymerization.

R in the group represented by $—OCOOR$ is a C1-C6 alkyl group, preferably a C1-C5 alkyl group, more preferably a C1-C4 alkyl group. R is still more preferably a methyl group, an ethyl group, an n-propyl group, an iso-propyl group, or a sec-butyl group.

The fluoropolymer can be produced by any known polymerization method, such as suspension polymerization, solution polymerization, emulsion polymerization, or bulk polymerization. In the polymerization, the conditions such as temperature and pressure and use of additives such as a polymerization initiator may be appropriately selected in accordance with the composition or amount of the desired copolymer.

The processing aid for polyolefins preferably contains 1 to 100 mass % of the fluoropolymer relative to the processing aid.

The processing aid for polyolefins may further contain a surfactant. Containing the surfactant can further improve the performance of the processing aid.

The surfactant is a compound having a lower melt. viscosity than the fluoropolymer at a processing temperature. When contained in the polyolefin composition to be mentioned later, the surfactant is preferably a compound that has a lower melt viscosity than a melt-fabricable resin at a processing temperature and can wet the surface of the fluoropolymer.

The surfactant is preferably at least one compound selected from the group consisting of silicone-polyether copolymers, aliphatic polyesters, aromatic polyesters, polyether polyols, amine oxides, carboxylic acids, aliphatic esters, and poly(oxyalkylenes). More preferred among these are poly(oxyalkylenes).

Preferred among the poly(oxyalkylenes) is polyethylene glycol. Polyethylene glycol preferably has number average molecular weight of 50 to 20000, more preferably 1000 to 15000, still more preferably 2000 to 9500.

The number average molecular weight of the polyethylene glycol is a value calculated from the hydroxyl value determined in conformity with JIS K0070.

Preferred among the aliphatic polyesters is polycaprolactone. Polycaprolactone preferably has a number average molecular weight of 1000 to 32000, more preferably 2000 to 10000, still more preferably 2000 to 4000.

The amount of the surfactant is preferably 1 to 99 mass %, more preferably 5 to 90 mass %, still more preferably 10 to 80 mass %, particularly preferably 20 to 70 mass %, in the processing aid. The amount of the surfactant is also preferably 50 mass % or more, more preferably more than 50 mass %.

The processing aid for polyolefins, even if only a small amount thereof is added to a polyolefin, can be dispersed in the form of particles in the polyolefin, can have an average dispersed particle size of 10 μm or smaller in the polyolefin, and can cause melt fracture to disappear in an equal period of time in comparison with conventional techniques. As mentioned above, a composition containing the processing aid for polyolefins and a polyolefin, wherein the amount of the processing aid for polyolefins is 0.0005 to 10 mass % relative to the whole mass of the composition, the processing aid for polyolefins is dispersed in the form of particles in the polyolefin, and the average dispersed particle size of the processing aid for polyolefins is 10 μm or smaller in the polyolefin is also one aspect of the present invention.

The polyolefin composition may further contain other components as long as the composition contains the processing aid for polyolefins and a polyolefin. The processing aid for polyolefins and the polyolefin contained in the polyolefin composition each may include one species thereof or two or more species thereof.

The polyolefin preferably has a melt-fabricable temperature of 100° C. to 350° C. The polyolefin may or may not have crystallizability.

The polyolefin, if having crystallizability, preferably has a melting point of 80° C. to 300° C., more preferably 100° C. to 200° C. A non-crystallizable polyolefin preferably has substantially the same processing temperature as a crystallizable polyolefin whose melting point range is known.

The melting point of a crystallizable polyolefin can be determined using a DSC device.

The polyolefin is a polymer obtained by polymerizing an α-olefin, such as polyethylene (PE), polypropylene (PP), ethylene/propylene copolymers, polystyrene (PS), AS resin (AS), ABS resin (ABS), methacrylic resin (PMMA), polymethyl pentene (PMP), polybutadiene resin (BDR), polybutene-1 (PB-1), polyvinyl alcohol (PVA), polyacrylonitrile (PAN), polymethacrylic styrene (MS), ethylene/vinyl acetate copolymers (EVA), ethylene/vinyl alcohol copolymers, and polyvinyl chloride (PVC).

The polyolefin is preferably at least one selected from the group consisting of low-density polyethylene (LDPE), linear low-density polyethylene (LLDPE), metallocene linear low-density polyethylene (mLLDPE), medium-density polyethylene (MDPE), high-density polyethylene, polypropylene (PP), polystyrene (PS), ethylene/vinyl acetate copolymers (EVA), and polyvinyl chloride (PVC). The polyolefin is more preferably at least one selected from the group consisting of low-density polyethylene, linear low-density polyethylene, high-density polyethylene, metallocene linear low-density polyethylene, polypropylene, polystyrene, and polyvinyl chloride.

The polyolefin is still more preferably polyethylene, polypropylene, or polystyrene, particularly preferably polyethylene or polypropylene. It is most preferably polyethylene.

The polyolefin can be synthesized by, for example, a conventionally known method in accordance with the type of polyolefin.

The polyolefin may be in any form such as powder, granules, or pellets. In order to efficiently melt the polyolefin and disperse the processing aid for polyolefins in the polyolefin composition, the polyolefin is preferably in the form of pellets.

The polyolefin composition is a dispersion of the processing aid for polyolefins in the form of fine particles in the polyolefin. The polyolefin composition in such a form can prevent occurrence of processing defects such as visually observable contaminants in thin-walled articles and poor surface smoothness.

In the polyolefin composition, the processing aid for polyolefins in the polyolefin has an average dispersed particle size of 10 μm or smaller. The processing aid for polyolefins having an average dispersed particle size of 10 μm or smaller can more uniformly attach to the die surface.

The average dispersed particle size of the processing aid for polyolefins is preferably 7 μm or smaller, more preferably 5 μm or smaller. The average dispersed particle size thereof is still more preferably 3 μm or smaller. The lower limit of the average dispersed particle size may be any value, and may be 0.1 μm or smaller.

The average dispersed particle size of the processing aid for polyolefins can be determined as follows. Specifically, the polyolefin composition is microscopically observed using a confocal laser microscope. Alternatively, an ultrathin slice is cut out of a pressed sheet or a pellet prepared from the polyolefin composition, and is microscopically observed using a transmission electron microscope (TEM) or a reflected light microscope. Then, the resulting image is binarized using an optical analyzer.

The polyolefin composition of the present invention may further contain other components, if necessary, in addition to the processing aid for polyolefins and the polyolefin. Examples of the components include anti-reagglomerating agents; ultraviolet absorbers; flame retardants; reinforcing materials such as glass fibers and glass powder; stabilizers such as minerals and flakes; lubricants such as silicone oil and molybdenum disulfide; pigments such as titanium dioxide and red iron oxide; conductive agents such as carbon black; impact-resistance improvers such as rubber; antioxidants such as hindered phenol antioxidants and phosphorus antioxidants; core-forming agents such as metal salts and acetals of sorbitol; and other additives recorded in the positive list that is formulated as voluntary standards by Japan Hygienic Olefin And Styrene Plastics Association.

The processing aid for polyolefins or the polyolefin composition may further contain an anti-reagglomerating agent, preferably in an amount of 1 to 30 parts by mass relative to 100 parts by mass of the fluoropolymer. This restrains reagglomeration of the fluoropolymer. The amount of the anti-reagglomerating agent is preferably 3 to 20 parts by mass, more preferably 5 to 15 parts by mass, relative to 100 parts by mass of the fluoropolymer. One anti-reagglomerating agent may be used alone or two or more anti-reagglomerating agents may be used in combination.

The anti-reagglomerating agent is preferably powder of an inorganic compound. For example, the anti-reagglomerating agent is preferably powder of any of inorganic compounds that are to be mentioned hereinbelow as examples of plasticizers, fillers, colorants, acid acceptors, or heat stabilizers.

The anti-reagglomerating agent may be any of those usually used as plasticizers, fillers, colorants, acid acceptors, or heat stabilizers.

Examples of the plasticizers include dioctyl phthalate and diglecyl phthalate.

Examples of the fillers include barium sulfate, calcium carbonate, graphite, talc, and silica.

Examples of the colorants include metal oxides such as titanium oxide, iron oxide, and molybdenum oxide.

Examples of the acid acceptors include magnesium oxide, calcium oxide, and lead oxide.

Examples of the heat stabilizers include calcium stearate and magnesium stearate.

The anti-reagglomerating agent is preferably any of the fillers. The anti-reagglomerating agent is more preferably at least one selected from the group consisting of talc, silica, and calcium carbonate.

The anti-reagglomerating agent is preferably powder having an average particle size of 0.01 µm or greater and 50 µm or smaller. The average particle size of the powder is more preferably 0.05 µm or greater and 30 µm or smaller, still more preferably 0.1 µm or greater and 10 µm or smaller. The average particle size of the anti-reagglomerating agent is a value determined in conformity with ISO 13320-1. The anti-reagglomerating agent may be surface-treated with a coupling agent, if necessary.

The polyolefin composition contains 0.0005 to 10 mass % of the processing aid for polyolefins relative to the whole mass of the composition. The polyolefin composition containing the processing aid for polyolefins at a proportion within the above range can be used as a processing material for providing articles, or can be processed into masterbatch for processing aids. The amount of the processing aid for polyolefins in the polyolefin composition is preferably 0.001 to 7 mass %, more preferably 0.0025 to 5 mass %, relative to the whole mass of the composition.

Especially when the polyolefin composition is used as a processing material, the polyolefin composition preferably contains 1 to 0.00005 mass % of the fluoropolymer relative to the polyolefin. The amount thereof is more preferably 0.5 to 0.001 mass %, still more preferably 0.2 to 0.0025 mass %.

The masterbatch for processing aids prepared from the polyolefin composition can be suitably used as a processing aid in processing polyolefins.

In the masterbatch for processing aids prepared from the polyolefin composition, the processing aid for polyolefins is uniformly dispersed in the polyolefin. Thus, adding the masterbatch in processing polyolefins can improve the processability in processing polyolefins, such as decreases in extrusion torque and extrusion pressure.

Examples of the polyolefin include the same polyolefins as mentioned above, and the polyolefin is preferably polyethylene or polypropylene, more preferably polyethylene.

The masterbatch for processing aids may be in any form such as powder, granules, or pellets. In order to keep the processing aid for polyolefins in the state of being finely dispersed in the polyolefin, the masterbatch is preferably in the form of pellets obtained by melt-kneading.

The melt-kneading is preferably performed at a temperature higher than the melting point of the fluoropolymer, more preferably 10° C. or more higher than the melting point.

The masterbatch for processing aids preferably contains the fluoropolymer in an amount of 0.05 to 10 mass % relative to the polyolefin. The amount thereof is more preferably 0.1 to 5 mass %.

The masterbatch for processing aids may further contain other components, if necessary, in addition to the processing aid for polyolefins and the polyolefin. The components may be any components, and examples thereof include the same components as those to be contained in the polyolefin composition.

The masterbatch for processing aids can be obtained by kneading, at 100° C. to 350° C., a matter prepared by adding the fluoropolymer and other desired components to the polyolefin.

Use of the processing aid for polyolefins or the masterbatch for processing aids in processing polyolefins is also one preferred embodiment of the present invention. Use of the processing aid for polyolefins or the masterbatch for processing aids in processing polyolefins at a temperature lower than 220° C. is also one preferred embodiment of the present invention.

Processing the polyolefin composition can provide an article. The processing may be performed by preparing the polyolefin composition in advance, feeding the composition into a processing device, and then, for example, melting and extruding the composition; or may be performed by feeding the processing aid for polyolefins, a polyolefin, and other desired components into a processing device at once, and then, for example, melting and extruding the components; or may be performed by feeding the masterbatch for processing aids and a polyolefin into a processing device at once, and then, for example, melting and extruding the components.

The polyolefin composition may be processed by any method such as extrusion molding, injection molding, or blow molding. In order to effectively enjoy the processability, extrusion molding is preferred.

The processing may be performed under any conditions, and the conditions may be appropriately adjusted in accordance with the composition and amount of the polyolefin composition to be used and specifications such as shape and size of a desired article, for example.

The processing temperature in the processing is usually not lower than the melting point of the polyolefin in the polyolefin composition but lower than the lower temperature selected from the decomposition temperatures of the fluoropolymer and the polyolefin. In order to significantly enjoy the effects of the processing aid for polyolefins, the processing temperature is preferably not lower than 140° C. but lower than 220° C.

In the case of extrusion molding, the processing temperature is also referred to as the extrusion temperature.

Even if the processing material is processed at a low temperature and a high shear rate, the polyolefin composition can reduce the extrusion pressure and enables short-time disappearance of melt fracture generated at the start of processing. For example, even if the material is processed at a temperature as low as not lower than 140° C. but lower than 220° C. and at a shear rate as high as 1,000 to 1,200 $sec^{-1}$, the composition can reduce the extrusion pressure and enables short-time disappearance of melt fracture.

The article may be produced by a method including, for example, a step of mixing the processing aid for polyolefins and the polyolefin to provide the polyolefin composition, and a step of processing the polyolefin composition to provide an article.

In the step of providing the polyolefin composition in the above production method, the composition is preferably obtained by mixing the components such that the amount of the fluoropolymer is 0.0005 to 1 mass % relative to the polyolefin.

The step of processing the polyolefin composition to provide an article in the above production method is preferably a step of processing the polyolefin composition at a temperature not lower than 140° C. but lower than 220° C. to provide an article. Even if the polyolefin composition is processed at such a low temperature, the composition can reduce the extrusion pressure and enables short-time disappearance of melt fracture generated at the start of processing.

The article may have any of various shapes, such as a sheet shape, a film shape, a rod shape, a pipe shape, or fibrous shape.

The article may be used in any application in accordance with the type of the polyolefin used. For example, the article can be suitably used in applications strongly requiring mainly physical properties, such as mechanical properties, and surface properties.

Examples of uses of the article include various films, bags, coating materials, tablewares such as containers for beverages, electric wires, cables, pipes, fibers, bottles, gasoline tanks, and other articles in various industries.

EXAMPLES

The present invention will be more specifically described referring to examples and comparative examples. Still, the invention is not limited to these examples.

The measured values described in the following examples and comparative examples are values determined by the following methods.

1. Composition of Copolymer

The composition of the copolymer was determined using a $^{19}$F-NMR device (AC300P, Bruker Corp.).

2. Melt Flow Rate (MFR)

The MFR was determined in conformity with ASTM 03159.

For the fluoropolymers 1 to 3, 5, and 6, the MFR was determined at 265° C. and 48 N. For the fluoropolymers 7 to 9, the MFR was determined at 297° C. and 98 N.

3. Melting Point

The temperature corresponding to the maximum value on a heat-of-fusion curve obtained at a temperature-increasing rate of 10° C./min using a DSC device (Seiko Instruments Inc.) was defined as the melting point.

of the processing aid. Finally, the pressure is stabilized at substantially a constant pressure (stabilized pressure). The difference between the initial pressure and the stabilized pressure was defined as the amount of decrease in pressure.

If the pressure was not stabilized within a set period of time, the difference between the initial pressure and the pressure at the finish time was defined as the amount of decrease in pressure.

(Production of Fluoropolymer)

Fluoropolymers 1 to 3: They were produced by a method similar to the polymerization method disclosed in the examples of JP 3428026 B.

Fluoropolymer 4: It was produced by a method similar to the polymerization method disclosed in the examples of JP 5140902 B. The fluoropolymer 4 is fluororubber.

Fluoropolymer 5: It was produced by a method similar to the polymerization methods disclosed in the examples of JP 4834971 B and U.S. Pat. No. 6,277,919 B.

Fluoropolymer 6: It was produced by a method similar to the polymerization method disclosed in the examples of U.S. Pat. No. 3,085,083 B except that no monomer I was used.

Fluoropolymer 7: It was produced by a method similar to the polymerization methods disclosed in the examples of JP S60-248710 A and WO 2011/007705.

Fluoropolymers 8 and 9: They were produced by a method similar to the polymerization methods disclosed in the examples of JP S60-248710 A and WO 2011/007705 except that the monomers II and III were used.

TABLE 1

| | Polymer composition (mol %) | | | | | | | Melting point (° C.) | MFR (g/10 min) | Measurement temperature (° C.) |
|---|---|---|---|---|---|---|---|---|---|---|
| | TFE | Ethylene | HFP | VDF | Monomer I | Monomer II | Monomer III | | | |
| Fluoropolymer 1 | 40.7 | 44.6 | 14.1 | — | 0.7 | — | — | 160 | 35.0 | 265 |
| Fluoropolymer 2 | 40.7 | 44.6 | 14.1 | — | 0.7 | — | — | 160 | 5.0 | 265 |
| Fluoropolymer 3 | 46.6 | 43.3 | 9.5 | — | 0.5 | — | — | 195 | 26.0 | 265 |
| Fluoropolymer 4 | — | — | 22 | 78 | — | — | — | — | — | — |
| Fluoropolymer 5 | 38.8 | — | 10.7 | 50.5 | — | — | — | 119 | 8.5 | 265 |
| Fluoropolymer 6 | 49.4 | 42.7 | 7.9 | — | — | — | — | 213 | 4.3 | 265 |
| Fluoropolymer 7 | 64.4 | 32.9 | — | — | 2.7 | — | — | 216 | 6.3 | 297 |
| Fluoropolymer 8 | 61.3 | 34.7 | — | — | — | — | 4 | 198 | 6.1 | 297 |
| Fluoropolymer 9 | 60.7 | 35.2 | — | — | — | 4.1 | — | 201 | 35.1 | 297 |

4. Melt Fracture Disappearance Time

A polyolefin alone was extruded until the pressure was stabilized with melt fracture appearing on the entire surface. At the time when the screw of the extruder became visible, the materials such as a processing aid of each composition were fed into a hopper. This timing was defined as 0. Then, the period of time from 0 to the time when the melt fracture disappeared and the entire surface of the article became smooth was defined as the melt fracture disappearance time. The disappearance of the melt fracture was confirmed by visual observation and touch examination.

If the visual observation and touch examination found that the entire surface was not a gloss, smooth surface with no melt fracture but was an entirely or partially undulated, stripe-like surface, this state is called "shark skin" herein.

5. Amount of Decrease in Pressure

In the extrusion evaluation to be mentioned later, the extrusion starts with an initial extrusion pressure (initial pressure) observed when linear low-density polyethylene alone is used without a processing aid. Then, as a processing aid is added, the pressure decreases as a result of the effect The substances in Table 1 are as follows.
TFE: tetrafluoroethylene
HFP: hexafluoropropylene
VDF: vinylidene fluoride
Monomer I: $CH_2=CFCF_2CF_2CF_2H$
Monomer II: $CH_2=CHCF_2CF_2CF_2CF_3$
Monomer III: $CH_2=CHCF_2CF_2CF_2CF_2CF_2CF_3$ (Examples and Comparative Examples)

The fluoropolymers 1 to 9 were used as processing aids. In Comparative Examples 1 and 8, the fluoropolymer 4 and an anti-reagglomerating agent including silica, talc, and calcium carbonate were mixed, and the mixture was used as a processing aid. The mass ratio between the fluoropolymer 4 and the anti-reagglomerating agent was 9/1. In Comparative Examples 2 and 9, the fluoropolymer 4 and polyethylene glycol (PEG, molecular weight: 8,000) were mixed, and the mixture was used as a processing aid. The mass ratio between the fluoropolymer 4 and the polyethylene glycol was 1/2.

(Production of Masterbatch)

Linear low-density polyethylene (density=0.918 g/cm$^2$, MI=3) and the processing aid were mixed such that the amount of the processing aid was 5 mass % relative to the sum of the masses of the linear low-density polyethylene and the processing aid. Further, 0.1 mass % of an antioxidant was mixed therewith. The mixture was fed into a twin-screw extruder (Labo Plastomill 30C150, Toyo Seiki Seisaku-sho, Ltd., screw L/D: 25, rotational speed of screw: 80 rpm), and masterbatch in the form of pellets was obtained. In order to improve the dispersion uniformity of the processing aid in the masterbatch, the resulting pellet-like masterbatch was tumble-mixed. Then, twin-screw extrusion was again performed under the same conditions as in producing the pellet-like masterbatch except that the rotational speed of the screw was changed to 100 rpm.

(1) The conditions for extruding the mixture of one of the fluoropolymers 1 to 3 and 5 to 9 and the linear low-density polyethylene were as follows.

Condition 1: cylinder temperature of 150° C., 250° C., and 250° C.; die temperature of 180° C.

(2) The conditions for extruding the mixture of the fluoropolymer 4 (fluororubber) and the linear low-density polyethylene were as follows.

Condition 2: cylinder temperature of 150° C., 170° C., and 180° C.; die temperature of 180° C.

An ultrathin slice was cut out of the resulting masterbatch and was microscopically observed using a reflected light microscope. The resulting image was binarized using an optical analyzer. This confirmed that the processing aid in the form of fine particles was dispersed in the linear low-density polyethylene in each masterbatch. The average dispersed particle size of the processing aid, determined on the binarized image, was 5 μm or smaller in each example.

Extrusion Evaluation 1

Examples 1 to 3 and Comparative Examples 1 to 7

Linear low-density polyethylene (density=0.925 g/cm², MI=0.7) and the masterbatch were tumble-mixed such that the amount of the masterbatch was 1 mass % relative to the sum of the masses of the linear low-density polyethylene and the masterbatch. The resulting linear low-density polyethylene containing the masterbatch was extruded through a single screw extruder (HAAKE, Rheomex OS, L/D: 33, screw diameter: 20 mm, die diameter: 2 mmϕ×40 mmL) at a cylinder temperature of 170° C. to 200° C., a die temperature of 200° C., and a rotational speed of the screw of 80 rpm. The changes in die pressure and melt fracture were observed. Table 2 shows the results. FIG. 1 shows the die pressure changes over time during the extrusion.

TABLE 2

|  | Processing aid | Amount of decrease in pressure (ΔP) (MPa) | Melt fracture disappearance time (min) | Appearance of extrudate after test |
|---|---|---|---|---|
| Example 1 | Fluoropolymer 1 | 5.9 | 20 | Gloss |
| Example 2 | Fluoropolymer 2 | 5.8 | 60 | Gloss |
| Example 3 | Fluoropolymer 3 | 5.0 | 60 | Gloss |
| Comparative Example 1 | Fluoropolymer 4 | *1 | Not disappeared | Shark skin |
| Comparative Example 2 | Fluoropolymer 4 + PEG | *2 | Not disappeared | Shark skin |
| Comparative Example 3 | Fluoropolymer 5 | 1.6 | Not disappeared | Shark skin |
| Comparative Example 4 | Fluoropolymer 6 | 4.3 | Not disappeared | Shark skin |
| Comparative Example 5 | Fluoropolymer 7 | 1.9 | Not disappeared | Shark skin |
| Comparative Example 6 | Fluoropolymer 8 | 0.8 | 10 | Gloss |
| Comparative Example 7 | Fluoropolymer 9 | 1.5 | 10 | Gloss |

*1 Extrusion pressure increased by 0.5 MPa
*2 Stable extrusion not achieved

The shear rate calculated by the following formula was about 1,200 sec$^{-1}$.

$$\gamma = \frac{4Q}{\pi R^3}$$

The symbols in the formula are as follows.
γ: shear rate (sec$^{-1}$)
Q: amount of extruded material (kg/hr)
R: radius of die (mm)

Table 2 and FIG. 1 show the following. In Examples 1 to 3, the pressure decrease (amount of decrease in pressure) was as high as 5.0 to 5.9 MPa, and melt fracture completely disappeared within 20 to 60 minutes from the start of adding the masterbatch. In contrast, in Comparative Example 1, the extrusion pressure conversely increased by 0.5 MPa. In Comparative Example 2, stable extrusion was not achieved. In Comparative Examples 3 to 5, melt fracture did not completely disappear even after 70 minutes from the start of adding the masterbatch. In Comparative Examples 6 and 7, the pressure decrease (amount of decrease in pressure) was smaller than in Examples 1 to 3.

In conclusion, the processing aids used in Examples 1 to 3 have a better effect of improving the processability in processing polyolefins at a low temperature and a high shear rate.

Extrusion Evaluation 2

Examples 4 to 6 and Comparative Examples 8 to 14

Figure 2:
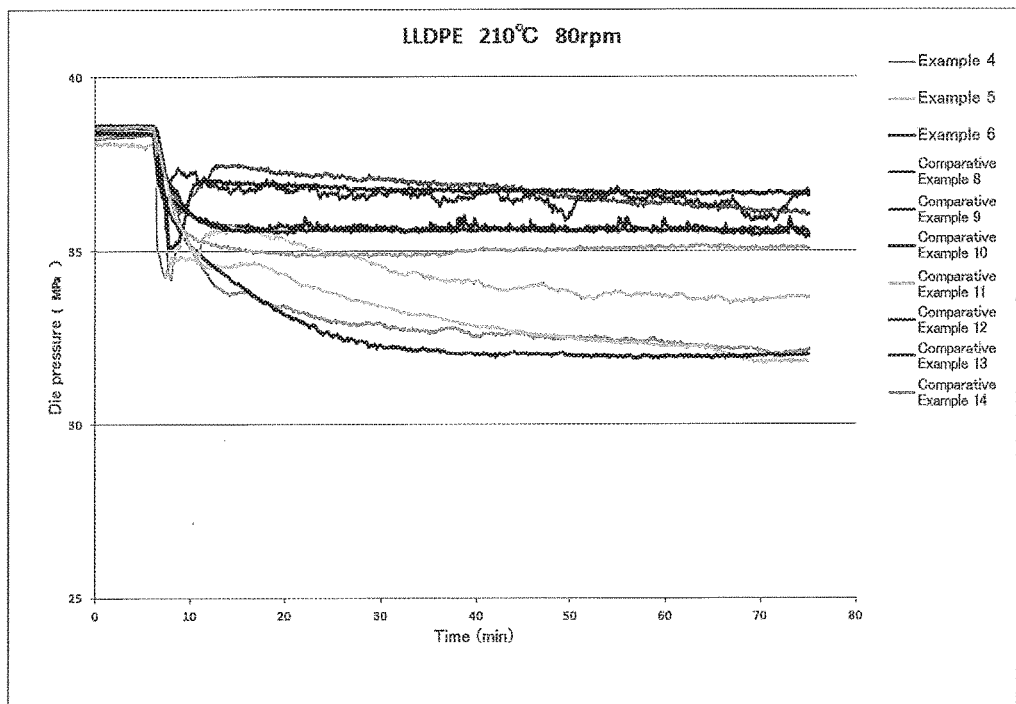
FIG. 2 is a graph of die pressure changes over time during extrusion in Examples 4 to 6 and Comparative Examples 8 to 14.

Linear low-density polyethylene (density=0.925 g/cm², MI=0.7) and the masterbatch were tumble-mixed such that the amount of the masterbatch was 1 mass % relative to the sum of the masses of the linear low-density polyethylene and the masterbatch. The resulting linear low-density polyethylene containing the masterbatch was extruded through a single screw extruder (HAAKE, Rheomex OS, L/D: 33, screw diameter: 20 mm, die diameter: 2 mmφ×40 mmL) at a cylinder temperature of 180° C. to 210° C., a die temperature of 210° C., and a rotational speed of the screw of 80 rpm. The changes in die pressure and melt fracture were observed. Table 3 shows the results. FIG. 2 shows the die pressure changes over time during the extrusion. The shear rate was about 1,200 sec$^{-1}$.

TABLE 3

|  | Processing aid | Amount of decrease in pressure (ΔP) (MPa) | Melt fracture disappearance time (min) | Appearance of extrudate after test |
|---|---|---|---|---|
| Example 4 | Fluoropolymer 1 | 6.1 | 20 | Gloss |
| Example 5 | Fluoropolymer 2 | 6.3 | 30 | Gloss |
| Example 6 | Fluoropolymer 3 | 6.5 | 30 | Gloss |
| Comparative Example 8 | Fluoropolymer 4 | 2.3 | Not disappeared | Shark skin |
| Comparative Example 9 | Fluoropolymer 4 + PEG | 1.8 | Not disappeared | Shark skin |
| Comparative Example 10 | Fluoropolymer 5 | 3.2 | 60 | Shark skin |
| Comparative Example 11 | Fluoropolymer 6 | 4.8 | Not disappeared | Shark skin |
| Comparative Example 12 | Fluoropolymer 7 | 1.9 | Not disappeared | Shark skin |
| Comparative Example 13 | Fluoropolymer 8 | 3.0 | 10 | Gloss |
| Comparative Example 14 | Fluoropolymer 9 | 3.4 | 10 | Gloss |

Table 3 and FIG. 2 show the following. In Examples 4 to 6, the pressure decrease (amount of decrease in pressure ΔP) was as high as 6.1 to 6,5 MPa, and melt fracture completely disappeared within 20 to 30 minutes from the start of adding the masterbatch. In contrast, in Comparative Examples 8 and 9, the pressure decrease (amount of decrease in pressure) was smaller than in Examples 4 to 6 and melt fracture did not completely disappear even after 70 minutes from the start of adding the masterbatch. In Comparative Examples 10, 13, and 14, the pressure decrease (amount of decrease in pressure) was smaller than in Examples 4 to 6. In Comparative Examples 11 and 12, melt fracture did not completely disappear even after 70 minutes from the start of adding the masterbatch.

In conclusion, the processing aids used in Examples 4 to 6 have a better effect of improving the processability in processing polyolefins at a low temperature and a high shear rate.

The invention claimed is:

1. A method of producing an article, the method including:
a step of mixing a processing aid for polyolefins and a polyolefin to provide a polyolefin composition, and
a step of processing the polyolefin composition to provide an article,
wherein the step of processing the polyolefin composition to provide an article is a step of processing the polyolefin composition at a temperature lower than 220° C.,
wherein the processing aid comprises
a fluoropolymer that includes
a polymerized unit (a) based on $CF_2=CFCF_3$;
a polymerized unit (b) based on at least one selected from the group consisting of:
monomers represented by the following formula (1):

$$CH_2=CX^{11}Y^{11}$$

wherein $X^{11}$ is H, F, $CH_3$, or $CF_3$; and $Y^{11}$ is an alkyl group, a fluoroalkyl group, an alkoxy group, or a fluoroalkoxy group; and
monomers represented by the following formula (2):

$$CF_2=CX^{21}Y^{21}$$

wherein $X^{21}$ is H or F; and $Y^{21}$ is an alkyl group, a fluoroalkyl group, an alkoxy group, or a fluoroalkoxy group, excluding $CF_2=CFCF_3$;
a polymerized unit (c) based on ethylene; and
a polymerized unit (d) based on tetrafluoroethylene,
wherein a proportion of the polymerized unit (a) is 0.1 to 25 mol % relative to the sum of the polymerized units (a) to (d),
a proportion of the polymerized unit (b) is 0.1 to 10 mol % relative to the sum of the polymerized units (a) to (d), and
a mole ratio (c)/(d) between the polymerized unit (c) and the polymerized unit (d) is 70/30 to 10/90,
wherein the fluoropolymer has a melt point of 110° C. to 220° C.

2. The method as claimed in claim 1,
wherein $Y^{11}$ is represented by the following formula:

$$-(CF_2)_{n11}Z^{11}$$

wherein $n^{11}$ is an integer of 1 to 10; and $Z^{11}$ is H or F.

3. The method as claimed in claim 1,
wherein $X^{21}$ is F; and $Y^{21}$ is represented by the following formula:

$$-(CF_2CF(Z^{21})O)_{m21}(CF_2)_{n21}F$$

wherein $Z^{21}$ is a fluorine atom or a trifluoromethyl group; $m^{21}$ is an integer of 1 to 4; and $n^{21}$ is an integer of 1 to 4.

4. The method as claimed in claim 1,
wherein the polymerized unit (b) is based on at least one selected from the group consisting of:
monomers represented by the following formula:

$$CH_2=CF(CF_2)_{n12}H$$

wherein $n^{12}$ is an integer of 1 to 10;
monomers represented by the following formula:

$$CH_2=CH(CF_2)_{n13}F$$

wherein $n^{13}$ is an integer of 1 to 10; and $$CH_2=C(CF_3)_2.$$

5. The method as claimed in claim 1, wherein the polymerized unit (b) is based on at least one monomer selected from the group consisting of $CH_2=CF(CF_2)_3H$, $CH_2=CH(CF_2)_6F$, and $CH_2=CH(CF_2)_4F$.

6. The method as claimed in claim 1, wherein the processing aid further comprises at least one surfactant selected from the group consisting of silicone-polyether copolymers, aliphatic polyesters, aromatic polyesters, polyether polyols, amine oxides, carboxylic acids, aliphatic esters, and poly(oxyalkylenes) in an amount of 1 to 99 mass % in the processing aid.

7. A polyolefin composition comprising a processing aid for polyolefins and a polyolefin,
an amount of the processing aid for polyolefins being 0.0005 to 10 mass % relative to the whole mass of the composition,
the processing aid for polyolefins being dispersed in a form of particles in the polyolefin,
the processing aid for polyolefins having an average dispersed particle size of 10 μm or smaller in the polyolefin,
wherein the processing aid comprises
a fluoropolymer that includes
a polymerized unit (a) based on $CF_2=CFCF_3$;
a polymerized unit (b) based on at least one selected from the group consisting of:
monomers represented by the following formula (1):

$$CH_2=CX^{11}Y^{11}$$

wherein $X^{11}$ is H, F, $CH_3$, or $CF_3$; and $Y^{11}$ is an alkyl group, a fluoroalkyl group, an alkoxy group, or a fluoroalkoxy group; and
monomers represented by the following formula (2):

$$CF_2=CX^{21}Y^{21}$$

wherein $X^{21}$ is H or F; and $Y^{21}$ is an alkyl group, a fluoroalkyl group, an alkoxy group, or a fluoroalkoxy group, excluding $CF_2=CFCF_3$;
a polymerized unit (c) based on ethylene; and
a polymerized unit (d) based on tetrafluoroethylene,
wherein a proportion of the polymerized unit (a) is 0.1 to 25 mol % relative to the sum of the polymerized units (a) to (d),
a proportion of the polymerized unit (b) is 0.1 to 10 mol % relative to the sum of the polymerized units (a) to (d), and
a mole ratio (c)/(d) between the polymerized unit (c) and the polymerized unit (d) is 70/30 to 10/90,
wherein the fluoropolymer has a melt point of 110° C. to 220° C.

8. The polyolefin composition as claimed in claim 7, wherein the polyolefin is at least one selected from the group consisting of low-density polyethylene, linear low-density polyethylene, high-density polyethylene, metallocene linear low-density polyethylene, polypropylene, polystyrene, and polyvinyl chloride.

* * * * *